Figure 1:
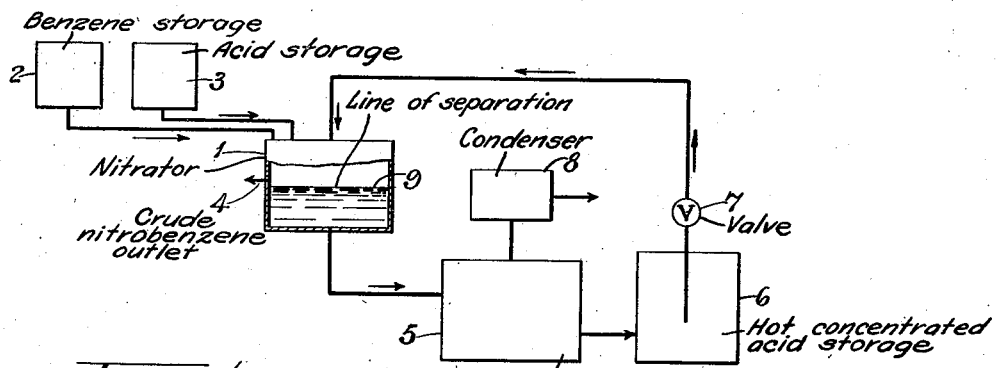
Figure 2:
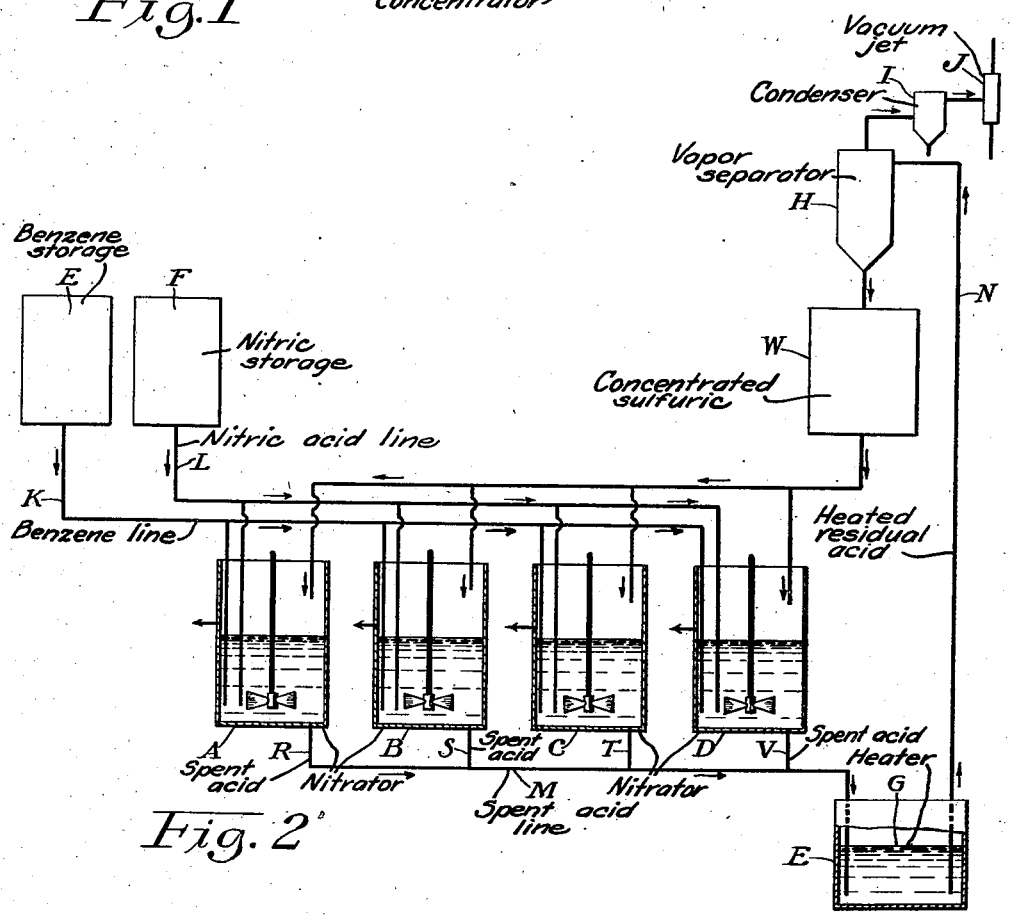

Sept. 23, 1941.  J. B. CASTNER  2,256,999

NITRATION OF ORGANIC COMPOUNDS

Filed March 8, 1939

James Bert Castner  INVENTOR.

BY Thos. A. Wilson

ATTORNEY

Patented Sept. 23, 1941

2,256,999

UNITED STATES PATENT OFFICE 2,256,999

NITRATION OF ORGANIC COMPOUNDS

James Bert Castner, Wilmington, Del., assignor to to E. I. du Pont de Nemours & Company, Wilmington, Del., a corporation of Delaware Application March 8, 1939, Serial No. 260,521

10 Claims. (Cl. 260—645)

This invention relates to a new and improved method of producing nitrated compounds by the reaction of organic compounds with sulfuric acid-nitric acid mixtures.

Two general methods are known for the nitration of organic compounds by means of mixed acids. In the first method the mixed acids are introduced into a nitrator provided with cooling means. The organic materials to be nitrated are then added gradually so that the cooling means is capable of absorbing substantially all the heat of reaction. In the second method the organic material is first introduced into the nitrator and the acid added gradually in order that the heat generated may be controlled by the cooling means. It is apparent, therefore, that in all of the nitration processes known to the art, it has been considered necessary to overcome the heat of reaction with specially provided cooling means. This procedure is especially disadvantageous in large scale nitration processes for several reasons. The heat of reaction, which may be considerable in a large scale process, is entirely wasted. Additional energy and effort are thrown away in making provision for the cooling means to counteract said heat of reaction.

Furthermore, in the course of the nitration process, the water formed causes dilution of the residual sulfuric acid. At the end of the conventional nitration reaction, therefore, there is left a comparatively cool, dilute residual acid which must be denitrated and concentrated. Both of these steps require large amounts of energy and involve considerable expense, yet these losses, as well as the wasting of the heat of reaction and expense of the cooling means, are necessarily involved in the nitration reaction as carried out heretofore.

The object of my invention is an improved method for the production of nitrated organic compounds, wherein efficient conservation of involved materials is effected. A further object is a method in which the heat of reaction is completely utilized. A still further object is a method capable of employing to the best advantage acids of concentrations readily available for use. Additional objects will be disclosed in the following description of my invention.

I have found that contrary to the teachings of the art, organic compounds may be safely nitrated without the necessity of removing the heat of reaction by external cooling means. Instead I have found that the foregoing objects are accomplished when the nitration process is carried out with utilization of the entire heat of mixing and of reaction, and the absorption of said heat in the contents of the nitrator. In my process the acids and organic compounds are mixed in the nitrator and no attempt is made to cool the reaction. Accordingly the temperature of the residual or spent acid remaining at the completion of the reaction is raised considerably. This hot, residual acid is then concentrated by any desired method to substantially the strength of the initial sulfuric acid, without loss of the heat of reaction. This reconcentrated residual acid is then used in a subsequent nitration cycle.

My invention is graphically illustrated in the appended drawing. Figure I is a schematic drawing, showing the arrangement of apparatus and the succession of steps for carrying out my invention in its broad aspects. Figure II shows a preferred embodiment with respect to the same.

Figure I shows the application of the invention particularly to the nitration of benzene to mononitrobenzene by means of mixed acid. A charge of sulfuric acid of 75% strength is introduced into nitrator 1, the acid being at a temperature of approximately 90° C. and being agitated vigorously and continuously. Sufficient nitric acid of 63% strength is run into the nitrator from tank 3 to form a mixed acid having a content of 3% HNO$_3$. Benzene is then introduced into the nitration acid from tank 2, in an amount slightly over the stoichiometric quantity necessary to react with the nitric acid present. The heat of mixing of the aqueous nitric acid with the sulfuric acid and the heat of nitration will cause a considerable rise in the temperature of the contents of the nitrator, for example to 110° C. Vigorous agitation is maintained and the nitration will be complete in about ten minutes, at the end of which time the mixed acid will have become completely denitrated. The agitation is then stopped. The nitrobenzene will separate from, and form a layer above, the spent acid, the line of separation coming at 9. The crude nitrobenzene can be removed from the nitrator through outlet 4.

The hot spent acid, free from nitric acid and separated from the greater part of the nitrobenzene, is caused to flow by gravity to concentrator 5. This concentrator may take any desired form, the only requirement being that it be capable of removing sufficient water from the sulfuric acid to restore the latter to the initial concentration. This will require the introduction of external heat, but in an amount greatly reduced from that which would be necessary if the heat of reaction were not conserved. The water and nitrobenzene removed are separated in condenser 8 and withdrawn from the system. The hot concentrated acid goes to storage vessel 6, from which it is pumped back, as required, for the next nitration cycle in nitrator 1.

Figure II shows a more specific embodiment of my invention, again applied to the nitration of benzene. In this drawing, four nitrators, A, B, C, and D, are arranged in parallel, each connected with (1) benzene storage tank E, (2) storage tank F for 63% nitric acid, (3) heater G, and (4) storage vessel W for concentrated sulfuric acid. Initially, hot 75% sulfuric acid at 90° C. is run into nitrator A from vessel W, vigorous agitation being maintained. Sufficient 63% $HNO_3$ is added to the nitrator from F to produce a mixed acid containing 4% $HNO_3$. Benzene in an amount at least sufficient to react with all the nitric acid in the nitrator is then introduced. After vigorous agitation and contact for around ten minutes, nitration is complete and the agitation is stopped. During the settling period following the nitration, a second nitration can be started in similar manner in nitrator B. When separation is complete, the crude nitrobenzene is drawn off through the outlet above the line of separation and can be sent to the neutralizer. The spent acid, free from nitric acid, is caused to flow to heater G, which, as indicated, is a receptacle for spent acid from any one or all of the nitrators A, B, C, and D. The spent acid arriving at G will comprise about 72% $H_2SO_4$ essentially, having a low nitrobenzene content also. Vessel G is heated in any desired manner, for example by steam jacketing or steam coils, and the heated residual acid is caused to flow through vapor separator H, which is maintained under a vacuum of 29 inches, induced by vacuum jet J, connected through surface condenser I. The acid flows from H to storage tank W for concentrated sulfuric acid. The acid in G is heated to a temperature such that, on subjection to the high vacuum in H, the acid boils by reason of its sensible heat content. The water thus lost and removed through J is sufficient to bring the residual acid to substantially the concentration initially present in A before the nitration. A small amount of nitrobenzene will be condensed with the water in I and can be readily separated.

The hot concentrated sulfuric acid in W is available for introduction into any one of the four nitrators in parallel, as desired. It will be apparent that the apparatus described is adapted for operation as a continuous process, though batch process operation can be carried out, if desired. By having the nitrators in parallel, no delay in operation is necessary and the capacity of the system is increased. While I have shown an arrangement of four nitrators, it will be understood that one nitrator alone may be used, or any desired number. Also, storage tank W may be omitted, and the hot acid feed to the nitrators directly from H, if desired.

From the detailed description of my invention by reference to the examples shown, its advantages will be appreciated. In the first place, complete utilization of the nitric acid content is attained. Hence, no denitration process is necessary for the residual acid. Because of the fact that the heat of mixing of the acids and the heat of nitration are completely conserved, concentration of the residual sulfuric acid is possible with greatly reduced power requirements than has heretofore been necessary. To this end, efficient insulation of storage vessel W will be desirable, as well as pipe lines for hot acid. It will be seen, therefore, that the method of my invention surpasses in simplicity any heretofore known. Only slight losses of materials result, and there is high efficiency in the conservation of the resulting heat energy. A slight loss of sulfuric acid will probably require the occasional addition of this acid in small quantities to the system. No elaborate cooling devices are necessary.

In the examples cited, the nitric acid content of the mixed acids was controlled at 3 or 4%. According to my invention, the initial nitric acid content is ordinarily kept below 10%, and preferably between 2 and 6%. However, my invention is not limited by the nitric acid content. With a low nitric acid content, there is no hazard in allowing the temperature of the reaction and of the nitrator contents to rise at will to the maximum. No nitric acid is ordinarily left in the spent acid, since an amount of benzene is preferably used, at least sufficient to react with the mixed acid completely. In the examples, sulfuric acid of 75% strength has been used and the residual acid then contained about 72% $H_2SO_4$. Preferably, the sulfuric acid content of the mixed acid will be between 68 and 76%, but it should be understood that my invention is operable with a much wider range of sulfuric contents.

It will be understood that the concentration of the residual sulfuric acid is not limited to any one method. In the method illustrated in Figure II, vacuum flash concentration was employed. I may, however, use any other desired method of concentration, for example, by use of horizontal or vertical boiling vessels of any desired form, whether operated under atmospheric or reduced pressure. The essential feature of my process is that the heat developed during the reaction be conserved and applied to the concentration of the residual acid. No elaborate external cooling means are necessary during the nitration. In fact, external cooling is especially avoided, by the utilization of generated heat for concentration of the residual acid.

The invention has been illustrated and described with particular reference to the nitration of benzene. It should be understood, however, that it is applicable to the nitration of organic nitratable materials other than benzene, as long as the nitrated product is one which is stable in the presence of hot sulfuric acid such as will result from a nitration in the manner described. The compound to be nitrated will preferably be one capable of denitrating completely mixed acids having a low content of nitric acid. As examples of compounds applicable according to my invention, I may cite benzene, toluene, xylene, naphthalene, monochlorbenzene, and other compounds to produce either the mono-nitro or di-nitro derivatives.

In the foregoing, my invention has been described in considerable detail. It will be understood, however, that many variations in procedure and apparatus may be introduced without departing from the scope of my invention. I intend to be limited only by the following patent claims.

I claim:

1. The process of producing nitrated organic compounds stable in the presence of hot sulfuric acid, which process comprises reacting with a sulfuric acid-nitric acid mixture, a nitratable organic compound capable of utilizing and sufficient in amount to utilize, the nitric acid content of the acid substantially completely to form a nitrated compound and utilizing the resultant heat to aid in concentration of the residual sulfuric acid toward its original concentration.

2. The process of producing nitrated organic compounds stable in the presence of hot sulfuric acid, which process comprises reacting with a sulfuric acid-nitric acid mixture, a nitratable organic compound capable of utilizing and sufficient in amount to utilize the nitric acid content of the acid substantially completely to form a nitrated compound, absorbing the heat of mixing and of reaction in the contents of the nitration vessel, withdrawing said nitrated compound from the spent nitration acid, utilizing said mixing and reaction heat to aid in concentration of the residual sulfuric acid toward its original concentration and re-employing said concentrated acid in a subsequent nitration.

3. The process of producing nitrated organic compounds stable in the presence of hot sulfuric acid and in liquid form under such conditions, which process comprises reacting with a sulfuric-nitric acid mixture, the nitric acid content being one selected as safe in view of the organic compound undergoing nitration, a nitratable organic compound capable of utilizing said nitric acid content completely to form a nitrated compound, absorbing the heat of mixing and of reaction in the contents of the nitration vessel, withdrawing said nitrated compound from the spent nitration acid, and utilizing said mixing and reaction heat to aid in concentration of the residual sulfuric acid toward its original concentration.

4. The process of claim 3, in which the nitratable organic compound is toluene.

5. The process of claim 3, in which the nitratable organic compound is monochlorbenzene.

6. The process of claim 3, in which the nitratable organic compound is benzene.

7. The process of claim 3, in which the extent to which the spent acid is concentrated is such that the amount of water removed is substantially equal to the combined water formed in the nitration reaction plus the water present in the nitric acid employed.

8. The process of producing a nitrobenzene, which comprises reacting benzene with a sulfuric-nitric acid mixture having a nitric acid content less than 10%, said benzene being present in amount sufficient to utilize the nitric acid content of the acid substantially completely to form a nitrobenzene, absorbing the heat of mixing and of reaction in the contents of the nitration vessel, withdrawing the nitrobenzene from the spent nitration acid, and utilizing said mixing and reaction heat to aid in concentration of the residual sulfuric acid toward its original concentration.

9. The process of producing a nitrobenzene, which comprises mixing aqueous sulfuric acid and aqueous nitric acid to form a mixed acid having a nitric acid content below 10%, introducing into said mixed acid an amount of benzene sufficient to react with the entire amount of nitric acid present, absorbing the heat of mixing and of reaction in the contents of the nitration vessel, withdrawing the nitrobenzene from the spent nitration acid, subjecting said spent acid to conditions of high vacuum, thereby causing said acid to boil, and effecting the removal from said spent acid of sufficient water to attain a residual acid of substantially the sulfuric acid content of the aqueous sulfuric acid introduced into the original mixed acid.

10. The process of claim 9, in which the nitric acid content of the mixed acid is between 2 and 6%.

JAMES BERT CASTNER.